Jan. 25, 1944. C. G. PULLIN 2,339,877
UNDERCARRIAGE FOR ROTATIVE WING AIRCRAFT
Filed April 6, 1940 3 Sheets-Sheet 1
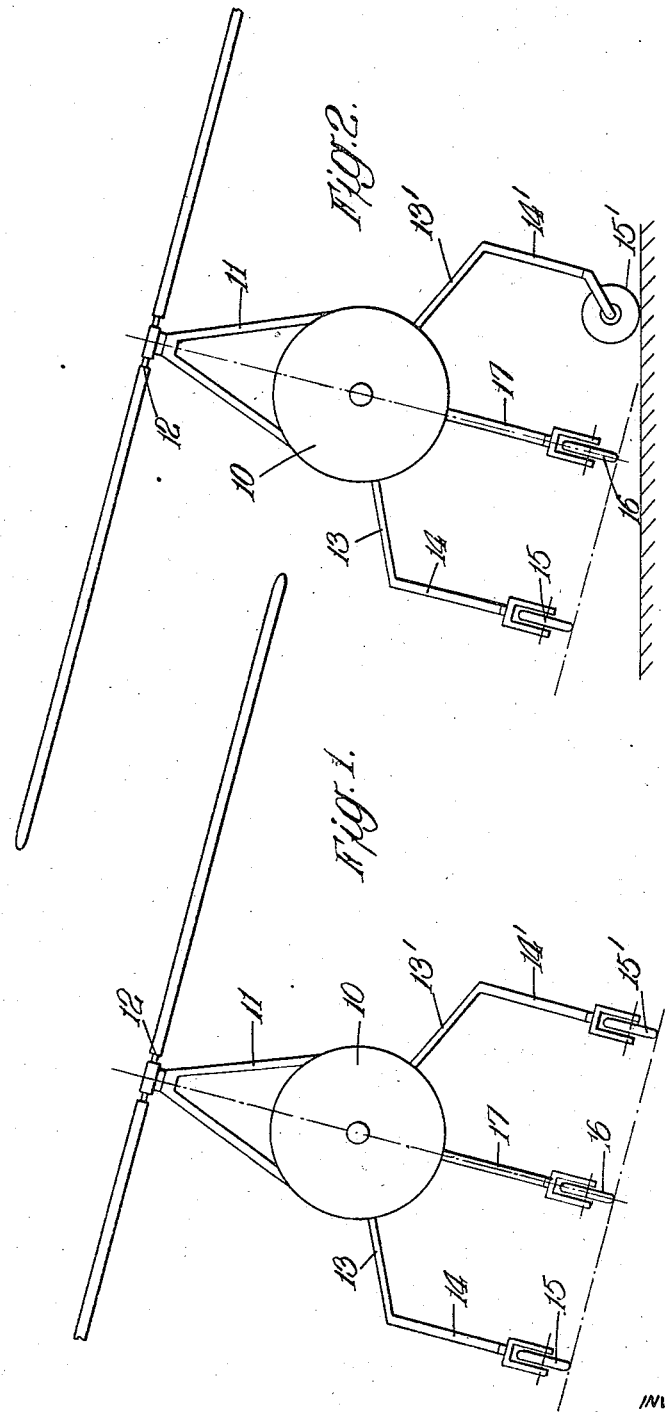
INVENTOR
Cyril George Pullin
ATTORNEYS
Synnestvedt + Lechner

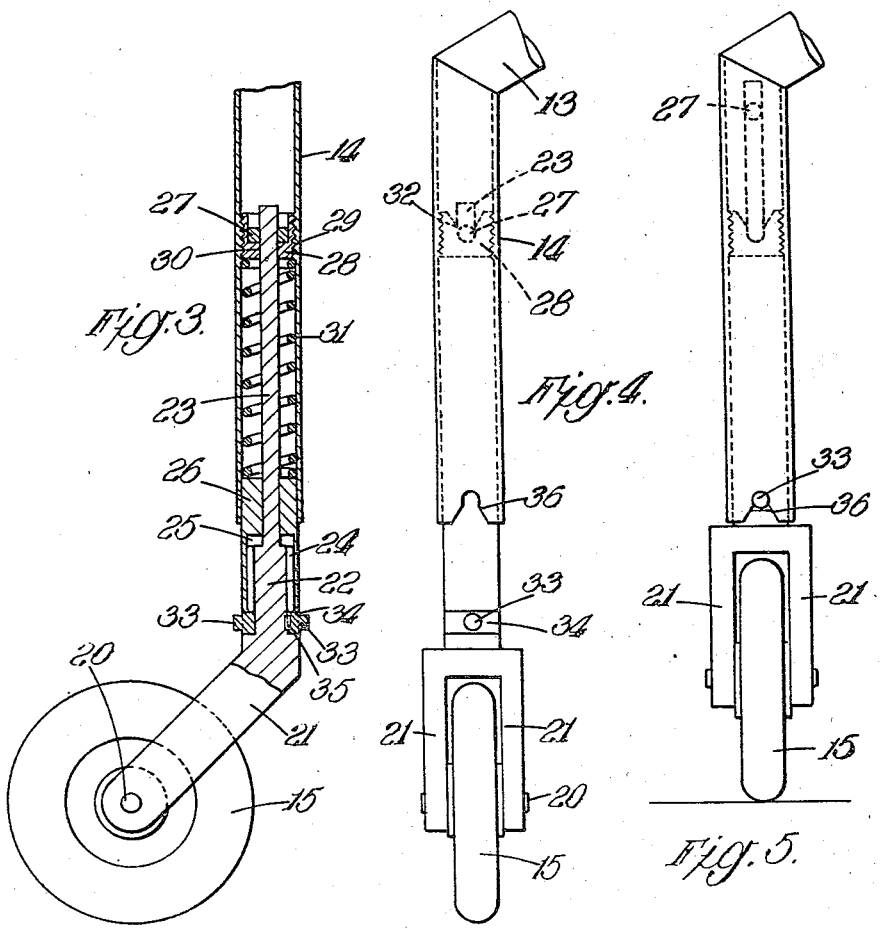

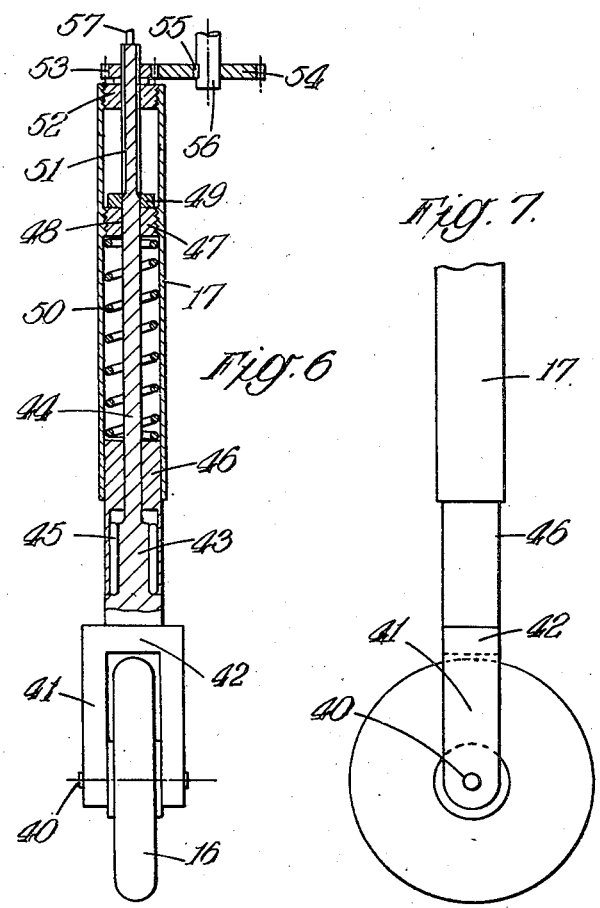

Patented Jan. 25, 1944

2,339,877

UNITED STATES PATENT OFFICE 2,339,877

UNDERCARRIAGE FOR ROTATIVE WING AIRCRAFT

Cyril George Pullin, Genista, Newton Mearns, Scotland, assignor to Autogiro Company of America, Willow Grove, Pa., a corporation of Delaware Application April 6, 1940, Serial No. 328,234 In Great Britain April 11, 1939

4 Claims. (Cl. 244—104)

The present invention relates to rotative wing aircraft and is applicable to aircraft having one or more rotors disposed on a vertical axis above the fuselage of the aircraft but is also applicable to aircraft having two or more rotors mounted on opposite sides of the longitudinal axis of the aircraft.

It has been found in the course of practical tests with rotative wing aircraft, and more especially with helicopters, that the ground interference or echo effect caused by the slipstream of the rotor (or rotors) produces considerable instability of the aircraft when it becomes just airborne. In the case of an aircraft having two rotors disposed one on each side of the fuselage there is available a certain amount of lateral control produced, for instance, by differential pitch change of the two rotors which gives the necessary stability about the longitudinal axis. In the case of a machine having a single rotor or two coaxial rotors arranged one above the other it is not possible to effect lateral correction of the aircraft without such correction being accompanied by lateral swing of the machine. With the aircraft say a few inches off the ground when the wind direction suddenly changes, the corrective moment will cause a lateral swing and at the same time the aircraft will tilt until one of the wheels touches the ground. With an undercarriage of normal construction in which the wheels are fixed in a fore and aft direction, this will produce an overturning moment on the aircraft which cannot be corrected by the rotor control and which may cause the aircraft to turn over. The effect is somewhat similar to that produced by side-slipping of the aircraft since there is lateral movement of the aircraft relatively to the ground.

According to the present invention a rotative wing aircraft is provided with landing wheels which are capable of castering freely as required by the velocity of the aircraft relatively to the ground. The aircraft may be provided with any desired form of undercarriage, the main wheels of which are capable of castering freely while the subsidiary nose or tail wheels may either be arranged to caster or be fixed in position as desired.

A feature of this invention consists in providing means for steering one or more of the ground-contacting wheels of the aircraft to facilitate taxiing.

The accompanying drawings illustrate an embodiment of this invention as applied to a rotative wing aircraft having a single sustaining rotor and provided with a main undercarriage with castering wheels and a steerable tail wheel. It is to be understood that this embodiment is illustrated by way of example only and that the present invention is not limited in scope to aircraft of this particular construction.

In the drawings:

Fig. 1 is a diagrammatic front elevational view showing a rotative wing aircraft in a side-slipping attitude;

Fig. 2 is a view similar to Fig. 1 showing the aircraft just after one of the main undercarriage wheels has contacted the ground;

Fig. 3 is an enlarged sectional view through one of the main undercarriage struts;

Fig. 4 is a front elevational view of the strut illustrated in Fig. 3 showing it in the extended position;

Fig. 5 is a view similar to Fig. 4 showing the strut compressed;

Fig. 6 is a sectional view on the axis of the steerable tail wheel; and

Fig. 7 is a fragmentary view at right angles to Fig. 6.

Referring to the drawings: A rotative wing aircraft has a fuselage 10, a pylon structure 11 carrying a sustaining rotor 12 and is provided with a main undercarriage comprising outrigger struts 13, 13' and generally vertical shock absorbing struts 14, 14' carrying at their lower ends main undercarriage wheels 15, 15'. The aircraft also has a tail wheel 16 carried by a shock absorbing strut 17 which is steerable as will hereafter be described with reference to Fig. 6.

Referring to Figs. 3, 4 and 5. These figures show the construction of the main undercarriage comprising the shock absorbing struts 14 and wheels 15. The wheel 15 has an axle 20 by which it is secured to forks 21 which join at their upper end and are extended upward by a cylindrical part 22 which is continued by a rod 23 which runs up through the centre of the strut 14. Surrounding the cylindrical part 22 is a roller bearing 24 which supports said cylindrical part within a recess 25 at the lower end of a plunger 26 which is vertically slidable within the strut 14. The upper end of the rod 23 has secured to it a pin 27 which coacts with a ring 28 secured by an internal screw thread 29 within the strut 14 and having an aperture 30 through which the rod 23 is freely slidable. A compression coil spring 31 is disposed between the lower face of the ring 28 and the upper face of the plunger 26 so that it surrounds the rod 23 and is enclosed within the strut 14. This spring 31 provides the shock absorbing action of the undercarriage but it is to be understood that the simple spring arrangement herein described may be replaced by any desired form of shock absorber, for instance of an hydraulic type.

The roller bearing 24 between the cylindrical part 22 carrying the wheel 15 and the plunger 26 allows relative turning between them to permit of free castering according to the direction of rotative motion between the aircraft and the ground at the moment of contact.

As shown in Fig. 4 the pin 27 at the upper end of the rod 23 cooperates with a V-shaped notch 32 on the upper surface of the ring 28 so that when the spring 31 is fully extended the rod 23 is maintained in a position such that the plane of the wheel 15 is approximately in a fore and aft direction of the aircraft, thus reducing wind resistance. A similar pin 33 is carried by an annulus 34 keyed at 35 to the cylindrical part 22 and cooperates with a V-shaped notch 36 at the lower end of the strut 14 to maintain the plane of the wheel 15 in a fore and aft direction when the shock absorbing strut is fully compressed by the weight of the aircraft, as indicated in Fig. 5. This allows the aircraft to resist cross winds when stationary on the ground or while it is being taxied, but does not in any way reduce the ability of the wheel 15 to caster since it takes an appreciable time for the spring 31 to be compressed by the weight of the aircraft and moreover the offset of the axle 20 from the castering axis is sufficient to prevent premature engagement of the pin 33 in the notch 36. Such engagement is therefore prevented until the lateral speed of the aircraft is reduced to an innocuous value.

Figs. 6 and 7 show the construction of the steerable tail wheel. The wheel 16 is carried by an axle 40 which extends between the pair of vertical forks 41 carried by a cross member 42 integral with a cylindrical part 43 extended upwardly through the centre of the strut 17 by a rod 44. Surrounding the cylindrical part 43 is a roller bearing 45 which is disposed between said cylindrical part 43 and a plunger 46 which is vertically slidable in the strut 17. Secured within the strut 17 is a ring 47 having an aperture 48 through which the rod 44 is freely slidable in an upward direction, downward movement being restrained by a collar 49 mounted on the rod 44. Disposed between the lower surface of the ring 47 and the upper surface of the plunger 46 is a compression coil spring 50 which resists upward movement of the tail wheel 16.

The upper end of the rod is splined as indicated at 51 and passes through a locating ring 52 at the upper end of the strut 17. The splines 51 carry a pinion 53 maintained against vertical movement by means (not shown) meshing with a second pinion 54 keyed at 55 to a shaft 56 by which the tail wheel is steered. It is to be understood that the shaft 56 is coupled to a pilot's steering control, such for example as a rudder bar. Extending upwardly from the upper end of the rod 44 is a pin 57 coupled by a mechanical linkage or otherwise to the rotor pitch control and so arranged that when the strut 17 is compressed the pitch of the rotor is decreased thereby reducing the lift. The pin 57 may also be arranged to apply a rotor brake under these conditions.

The operation of the main undercarriage is best seen in Figs. 1 and 2. Fig. 1 shows the aircraft side-slipping and it will be observed that the wheels 15, 15' are both disposed in a fore and aft direction and that the tail wheel 16 is also in a similar position. Fig. 2 shows the aircraft immediately after the wheel 15' of the main undercarriage has touched the ground. It will be noted that the shock absorbing strut 14' is partly compressed and that the wheel 15' is castered to a position in which it allows the aircraft to move freely in a lateral direction, thus avoiding the setting up of an overturning moment. When the other wheel 15 comes into contact with the ground it will also caster to a similar position.

It is not essential that the tail wheel 16 should be allowed to caster as normally this wheel will touch the ground after the wheels 15, 15' of the main undercarriage, though if desired castering action of the tail wheel may also be provided for.

What I claim is:

1. In a rotative wing aircraft a main undercarriage comprising a pair of wheels, forked members carrying each of the wheels and turnable relatively to fixed parts of the undercarriage to permit castering action of the wheels, shock absorbing means operative between the forked members and the fixed parts of the undercarriage, pins carried by the forked members, said fixed parts of the undercarriage having notches adapted to engage and hold said pins when the shock absorbing means are fully extended or fully compressed to locate the wheels in generally fore and aft direction, said pins and notches being out of engagement when the shock absorbing means are partially compressed.

2. In a rotative wing aircraft, a main undercarriage comprising a pair of landing wheels each having a shock absorbing strut, a member in which the wheel is mounted, said member being carried by the strut and being turnable with respect thereto to permit castering action of the wheel, shock absorbing means operative between said member and said strut, and centering means having parts which come into engagement to center the wheel in a vertical plane generally fore and aft of the aircraft when the shock absorbing means is fully compressed under the weight of the aircraft, said parts being out of engagement to permit castering when the shock absorbing means is partially compressed.

3. In a rotative wing aircraft, a main undercarriage comprising a pair of landing wheels each having a shock absorbing strut, a member in which the wheel is mounted, said member being carried by the strut and being turnable with respect thereto to permit castering action of the wheel, shock absorbing means operative between said member and said strut, and centering means having parts which come into engagement to center the wheel in a vertical plane generally fore and aft of the aircraft when the aircraft is in flight or when the shock absorbing means is fully compressed under the weight of the aircraft, said parts being out of engagement to permit castering when the shock absorbing means is partially compressed.

4. In a rotative wing aircraft, a shock absorbing strut, a landing wheel and a member in which said wheel is mounted, said member being carried by the strut and being turnable with respect thereto to permit castering action of the wheel, shock absorbing means operative between said member and said strut, centering means to center the wheel in a vertical plane generally fore and aft of the aircraft, said centering means comprising pins carried by said member, and cooperating V-shaped notches in said strut, said notches being so located that the sides thereof will engage the pins to move and held the pins in such position that the wheels are centered in said plane when the pins engage the notches, the pins engaging the notches only when the shock absorbing means is fully compressed under the weight of the aircraft or when the aircraft is in flight, said pins being disengaged from the notches when the shock absorbing means is partially compressed.

CYRIL GEORGE PULLIN.